United States Patent [19]

Rothenbuhler

[11] 4,206,238
[45] Jun. 3, 1980

[54] METHOD AND APPARATUS FOR PROCESSING SWISS CHEESE

[76] Inventor: Hans R. Rothenbuhler, 15815 Nauvoo Rd., Middlefield, Ohio 44062

[21] Appl. No.: 918,703

[22] Filed: Jun. 26, 1978

[51] Int. Cl.² .............................................. A23C 19/02
[52] U.S. Cl. ....................................... 426/36; 53/392; 53/434; 99/452; 99/494
[58] Field of Search ..................................... 426/36–40; 99/452, 494; 198/342, 506; 53/434, 392

[56] References Cited

U.S. PATENT DOCUMENTS

| | | | |
|---|---|---|---|
| 2,681,015 | 6/1954 | Davis | 198/342 X |
| 2,726,023 | 12/1955 | Moravecky | 53/392 |
| 2,982,072 | 5/1961 | McGihon | 53/392 X |
| 3,508,375 | 4/1970 | Myers | 53/434 X |
| 3,757,500 | 8/1956 | Heinl et al. | 53/392 X |
| 3,975,275 | 8/1976 | Kato | 198/506 X |
| 4,068,014 | 1/1978 | Heimbruch | 99/452 X |

*Primary Examiner*—Robert L. Lindsay, Jr.
*Attorney, Agent, or Firm*—Watts, Hoffmann, Fisher & Heinke Co.

[57] ABSTRACT

Blocks of curd, solidified and formed in open tank-like trucks, are transferred to a brine tank by overhead monorail and floated in brine to withdraw moisture. The blocks are moved along the tank by a floating boom and/or an air-induced circulation of the brine solution, and are removed at one end of the tank by an inclined, partially submerged, conveyor. The blocks are conveyed from the tank, seal in an evacuated bag, weighed, and conveyed to a crating station where a crate is placed up side down over the block and the block and crate are rotated vertically by a tiltable portion of a conveyor to invert the crate and block for further handling, storage and curing.

8 Claims, 7 Drawing Figures

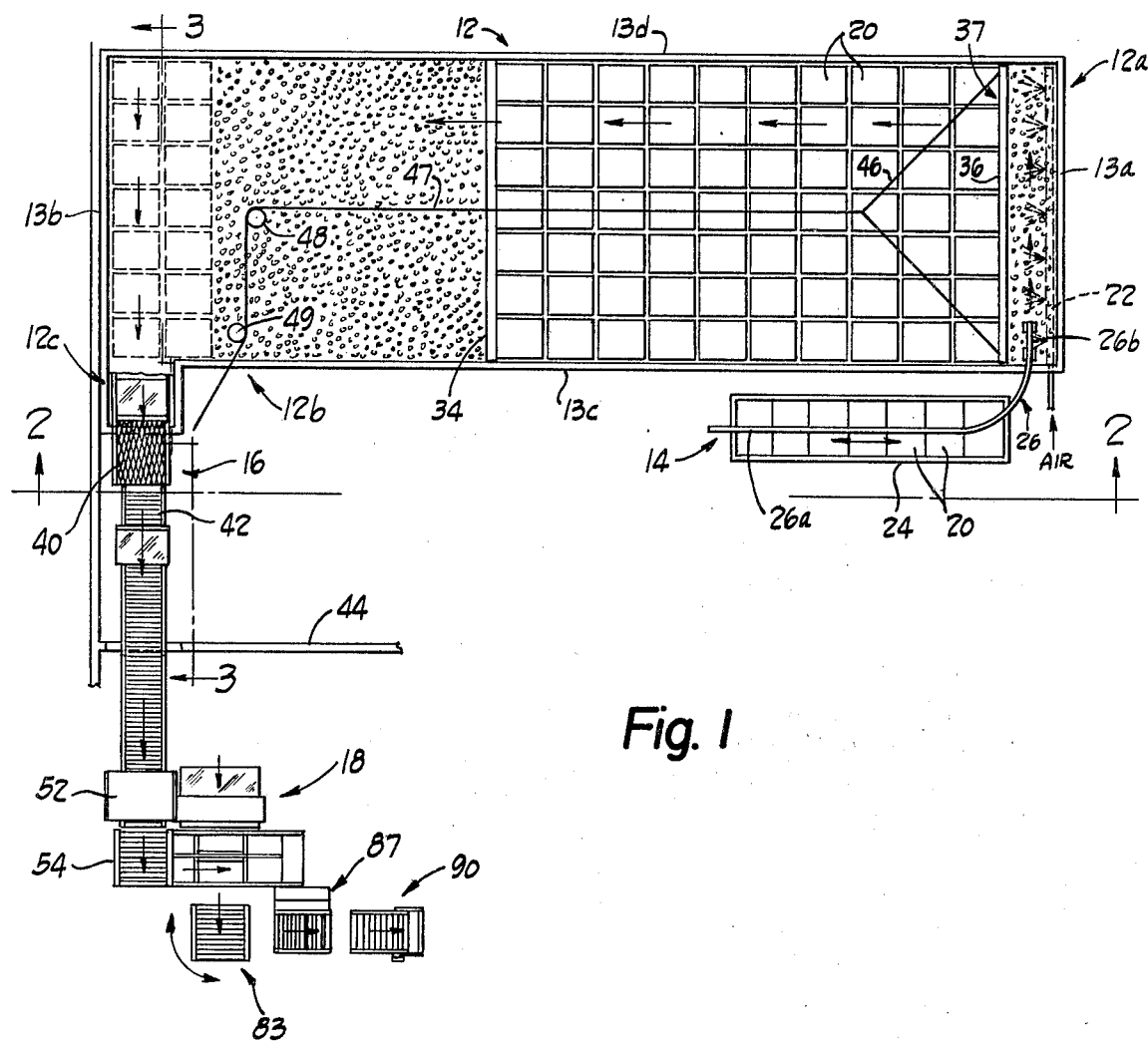
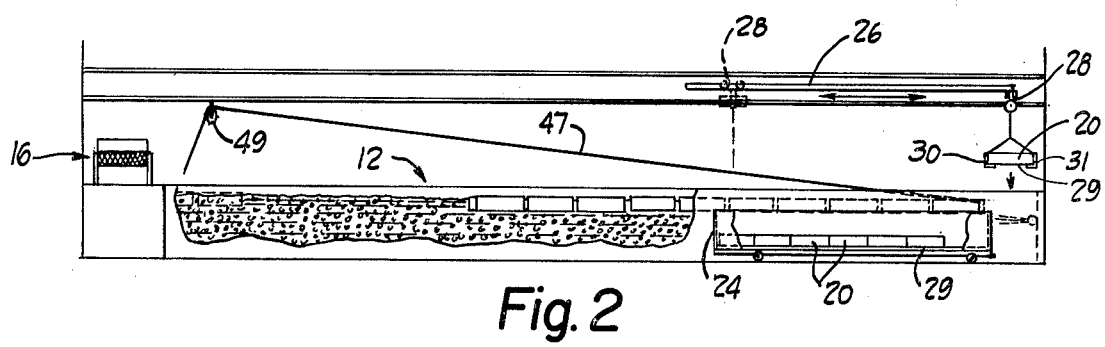
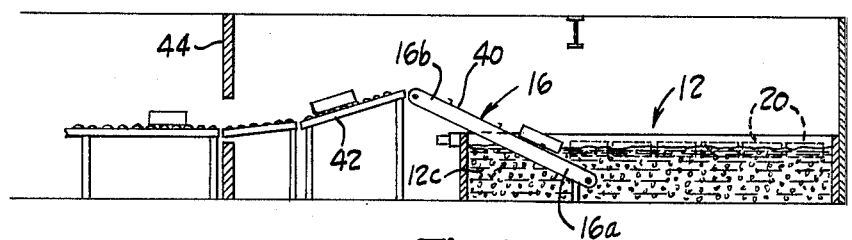

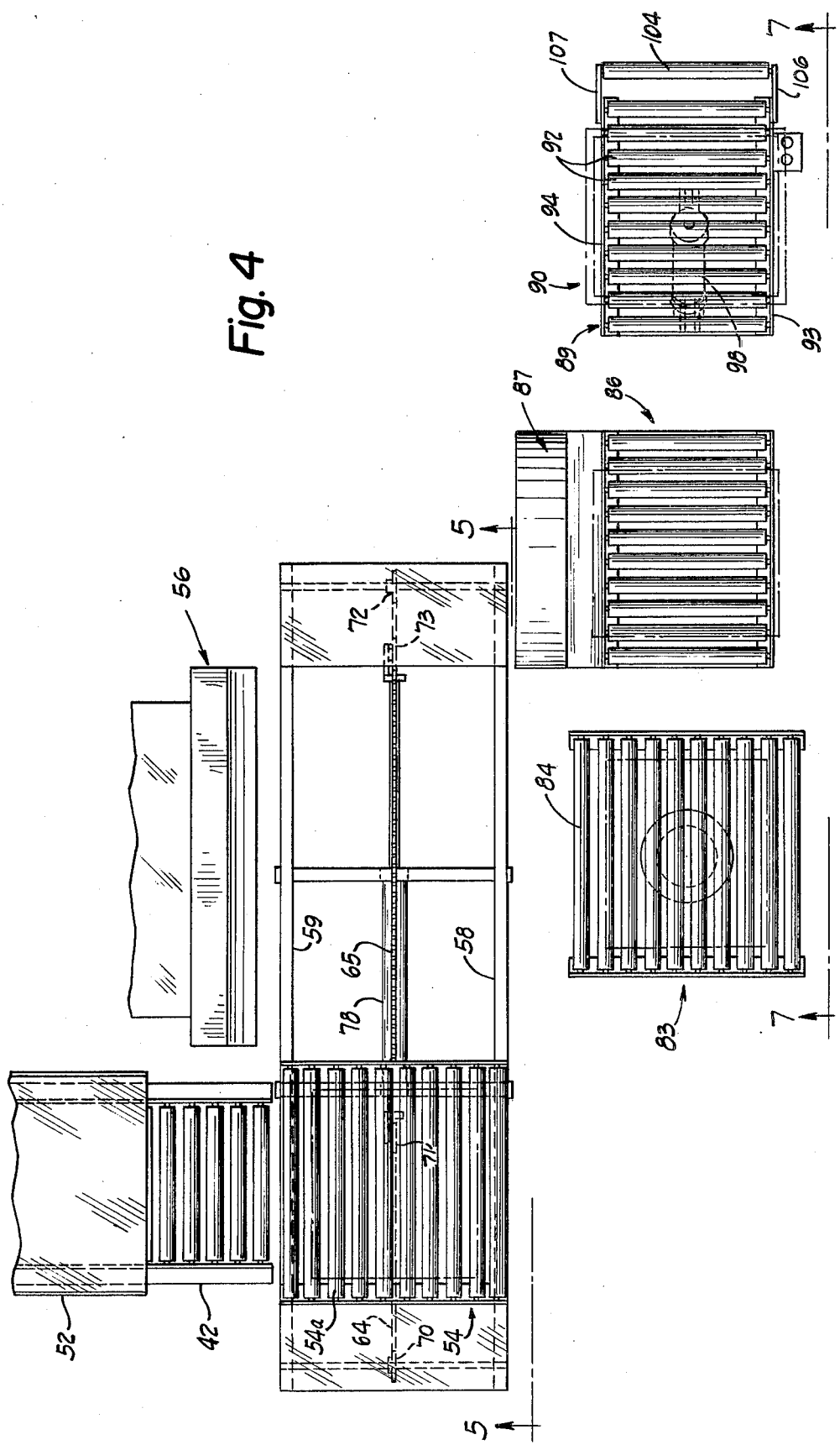

4,206,238

METHOD AND APPARATUS FOR PROCESSING SWISS CHEESE

BACKGROUND OF THE INVENTION

1. Field of the Invention

This invention relates to the manufacture of cheese and particularly the efficient handling and processing of curd blocks through a brine bath and subsequent bagging and crating operations.

2. Prior Art

In the manufacture of Swiss cheese, milk is processed in batches to form curd that is separated from the remaining liquid or whey, compressed, and cut into large blocks. The blocks are placed in a brine solution where additional moisture is removed from the curd over a period of many hours by the brine solution. The blocks are then removed from the solution, crated, stored in stacks for aging, and shipped. Typically, this has been largely a manual operation requiring the lifting and handling of cheese blocks that weigh about 200 pounds. The heavy nature of the work has made if difficult to assign workers to some of the necessary tasks involved and has adversely affected employee morale because other tasks in the processing are more easily performed. The need for several workers to perform the handling operations and the limitations of the handling efficiency upon the production rate have resulted in a higher cost for processing the cheese than is desired.

SUMMARY OF THE INVENTION

The present invention provides methods and apparatus useful in the processing of cheese that substantially reduce the lifting and manual handling of the large, heavy, cheese blocks and that substantially increase the quantity of cheese that can be processed per man hour.

In accordance with this invention, blocks of curd to be processed into cheese and which have been compacted, shaped and cut on tank-like trucks, are transferred to a brine solution at one end of a large tank. A hoist carried on an overhead monorail is movable from adjacent the tank to a position over the brine solution. The blocks of curd, supported on plates that form part of the truck, are lifted by the hoist from the trucks adjacent the tank, carried to a position over the tank, and lowered into the tank. The blocks, which float, are removed from the plates as they are buoyed by the brine solution and are positioned in a row across the back of the tank. The row is then moved along the tank to make room for a subsequent row of blocks. A temporary movable barrier is placed across the tank in front of the leading row to restrain the blocks in rows as the tank is being loaded. After the tank is filled in this manner the blocks remain in the solution a predetermined time during which moisture is removed from the curd and a rind is formed on surfaces of the blocks.

Unloading of the tank is by an inclined, partially submerged, conveyor at the opposite end of the tank from the loading end. Rows of blocks are moved toward the conveyor by either a floating cross board or boom at the loading end movable, as by a drag line, toward the conveyor to index the rows of blocks toward the conveyor, or by an air-jet manifold located just below the surface of the solution at the loading end of the tank, or by both. The conveyor lifts and carries floating blocks from the row at the end of the tank to a conveyor system that carries the blocks to a bagging, evacuation and sealing station, to a weighing station, and thence to a crating station, utilizing conveying mechanisms that eliminate manual carrying and lifting of the blocks.

To facilitate crating, the terminus of the conveyor system has a power tiltable conveyor portion. A crate is placed upside-down over a block on the tiltable portion of the conveyor. The conveyor portion, block and crate are then rotated vertically through slightly more than 90° and the block and crate are then lowered by a worker into a right-side-up position and carried to storage.

The above features and others will become better understood from the detailed description that follows, when considered in connection with the accompanying drawings.

BRIEF DESCRIPTION OF THE DRAWINGS

FIG. 1 is a top plan view of a brine tank and conveying system through which blocks of compressed curd are processed in the manufacture of Swiss cheese;

FIG. 2 is a side elevational view of the tank and related structure of FIG. 1, taken along the line 2—2 looking in the direction of the arrows;

FIG. 3 is a view partially in section and partially in side elevation of the tank and conveyor shown in FIG. 1, taken along the line 3—3 looking in the direction of the arrows;

FIG. 4 is a top plan view on an enlarged scale of a portion of the conveyor system of FIG. 1, illustrating a transfer mechanism, bagging station, weighing station, turntable, and tilting mechanism;

DETAILED DESCRIPTION OF A PREFERRED EMBODIMENT

Figure 5:
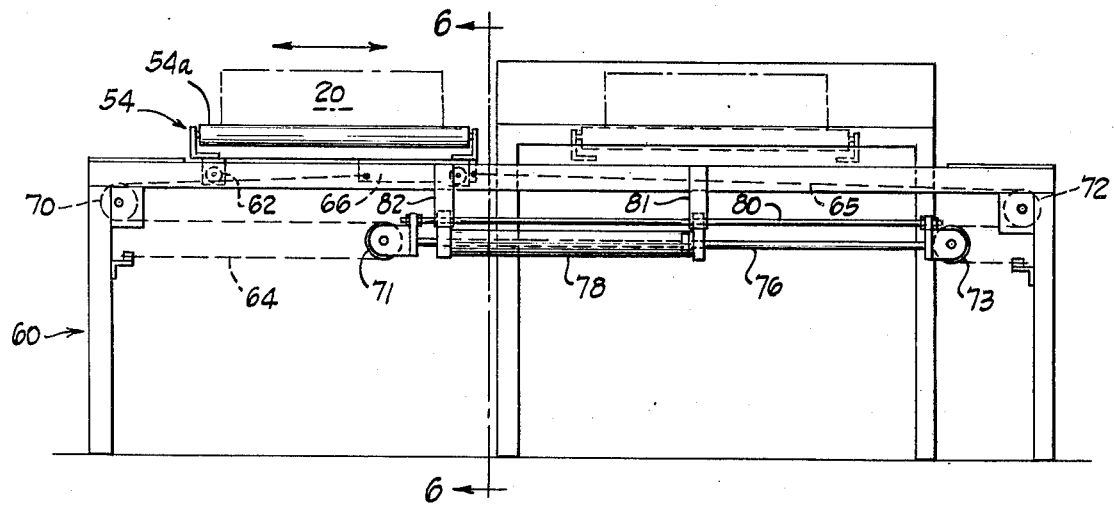
FIG. 5 is a side elevational view of the transfer mechanism of FIG. 4, taken along the line 5—5 looking in the direction of the arrows.

A tank and handling equipment constructed in accordance with the present invention for the processing of blocks of compressed curd in the manufacture of Swiss cheese are shown in FIG. 1 of the drawings. The basic structures shown include a brine tank 12, an overhead loading conveyor 14 at one end of the tank, a partially submerged conveyor 16 at the other end of the tank, and a conveyor and handling system 18 for bagging, weighing and crating blocks of cheese, preparatory to storing and aging. The construction and arrangement of the tank and handling equipment facilitates processing a day's production of large, heavy blocks of curd by a four man crew.

The brine tank 12 contains a brine solution and as shown in FIG. 1 is partially filled with floating blocks 20 of compressed curd to be treated for several hours in the brine solution. The blocks 20 are approximately 30 inches by 24 inches by six inches and weigh approximately 200 pounds. The tank 12 has a loading end 12a, an unloading end 12b and is generally rectangular except for a small laterally extending portion 12c at the unloading end, to accommodate the discharge conveyor 16. The tank is formed of end walls 13a, 13b and side walls 13c, 13d. The width of the tank accommodates seven of the blocks in each row and the length accommodates approximately 19 to 20 rows. The brine solution is approximately three feet deep in the tank. Bubblers (not shown) in the bottom of the tank discharge gas under pressure to circulate the brine solution to assure a maximum concentration of dissolved salt and to maintain a uniform temperature. Cooling pipes (not shown) maintain the temperature of the brine solution at the desired level, typically 40° F. An air manifold 22 extends along the loading end 12a of the tank adjacent the wall 13a and just beneath the surface of the brine solution. Spaced outlets along the length of the manifold direct air under pressure toward the discharge end of the tank. Discharge of air through the manifold creates a current of brine solution along the surface in a direction toward the discharge end of the tank to promote movement of the floating blocks in that direction.

The loading conveyor 14 is used to carry blocks 20 from a carrier or so-called "tank truck" 24 adjacent one side of the tank to a position over an adjacent corner of the tank at the loading end 12a. The conveyor includes an overhead monorail track 26 and a hoist mechanism 28 (FIG. 2) movable along the track. A portion 26a of the overhead track extends along the truck 24, and a portion 26b extends over the corner of the tank 12. The arrangement facilitates transfer of blocks from the truck to the near corner of the tank loading end 12a.

The truck 24 carries seven blocks of compressed curd, each with a separate underlying metal plate 29. The truck is constructed so the blocks can be directly formed in the truck. To that end the truck facilitates receipt of curd with excess whey, draining of the curd, compression into an elongated slab of a shape formed by side walls of the truck, and cutting of the slab into blocks on the truck. To remove each block, opposite sides of the underlying metal plate are gripped by suspended angle pieces 30, 31 from the hoist mechanism 28 (FIG. 2), which act like tongs. The hoist is operated to lift the supported block from the stationary truck, and is then rolled along the overhead monorail track to the tank 12, where the block and plate are lowered into the brine solution at the loading end 12a adjacent the corner defined by walls 12a and 12c. The buoyancy of the block lifts it from the metal supporting plate and it is moved off the plate without damage and pushed across the tank toward the opposite side 13d. The plate is then returned to the truck and a new block and plate are picked up by the hoist. In this manner, a row of blocks is transferred from the tank truck to the tank and aligned along the wall 13a at the loading end 12a. During such transfer, it is convenient to maintain the transferred blocks in a uniform row by wedging a 2×4 or other beam across the width of the tank. Such a beam is shown at 34 partway down the length of the tank, and this is moved the length of one row prior to each additional transfer of blocks from a tank car. A boom 36, forming part of a drag line apparatus 37 is shown for convenience of illustration across the tank defining a space at the loading end 12a for a row of blocks. This apparatus will be described in more detail subsequently, but for present purposes it should be understood that the boom may be used as shown to advance the blocks so that another row of blocks can be loaded, or the boom may be removed during loading and the surface current caused by the air manifold 22 relied upon to move the blocks each time the beam 34 is repositioned and secured to hold the already loaded blocks in their arrangement of rows, while providing a space at the loading end 12a for the next row. In this manner, the tank is filled with blocks, which remain for a period of time, e.g., 10 hours, during which moisture is drawn from the curd and a rind formed about the block.

As shown in FIGS. 1 and 3, the discharge conveyor 16 is inclined into the brine tank 12 at the discharge end 12b for removing the floating blocks 20 from the tank. The conveyor utilizes a power driven endless steel mesh belt 40. A lower end 16a of the conveyor is beneath the submerged level of the blocks in the row of blocks directly adjacent the end wall 13b of the tank. The upper end 16b of the conveyor is above and laterally beyond the side wall of the tank. The belt 40 of the conveyor angles into the tank through the laterally extending portion 12c so that the upper reach is sufficiently submerged at the plane of the side wall 13c that it is beneath the nearest block 20. The belt 40 is operated so that the upper reach moves in the direction away from the tank 12. With the belt operating, an operator manually moves each block one after another from the row adjacent the wall 13b, with a long hooked pole, onto the belt, which then partially supports the weight of the block and through frictional engagement raises the block from the bath and moves it out of the tank to a gravity operated roller conveyor 42 inclined in the opposite direction from the discharge conveyor 16 to carry the blocks through a partition 44 from the area containing the brine tank into an area housing the conveying and handling system 18.

During the removal of the row of blocks adjacent the wall 13b, the remainder of the blocks are held in corraled fashion by a 2×4 beam between the row being removed and the adjacent row upstream, just as the beam 34 held the blocks during loading. Following the complete removal of the seven blocks in the row adjacent the wall 13b, the 2×4 beam is removed and all rows of blocks within the tank are advanced toward the discharge end. This is facilitated by the drag line apparatus 37 and/or the surface current flow of the brine solution caused by the air manifold 22. The drag line apparatus 37 with its floating boom 36, when used, exerts a positive force across the full width of the tank on the last row of blocks upstream from the discharge end 12b. Movement of the boom is accomplished by a harness 46 and a line 47 that extends toward the discharge end and is guided over overhead pulleys 48, 49 that carry the line 47 above the brine solution centrally of the tank and then toward the side wall 13c to a position adjacent the discharge conveyor 16. An operator at the discharge end of the tank can, by pulling the line 47, draw the floating boom 36 toward the discharge end of the tank and thereby advance the blocks the distance of one row to position a new row of blocks adjacent the end wall 13b for removal by the discharge conveyor 16. This movement can be assisted by the air manifold 22 or alternatively, the air manifold will cause the rows of blocks to float toward the discharge end as soon as the restraining 2×4 adjacent the last row of blocks is removed. It is important that this movement of blocks be uniform across the entire width of the tank to assure that the floating blocks retain an orderly arrangement, which facilitates the efficient removal by the discharge conveyor 16.

Figure 6:
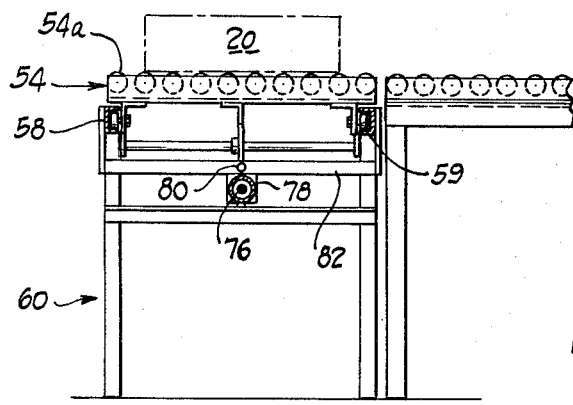
FIG. 6 is a transverse sectional view of the transfer mechanism of FIGS. 4 and 5, taken along the line 6—6 of FIG. 5 looking in the direction of the arrows.

As each block moving on the gravity-operated roller conveyor 42 reaches the conveying and handling system 18, it passes beneath a shelf 52 and onto a laterally movable roller section 54 (FIGS. 1 and 4-6) at the end of the gravity conveyor 42. As the block moves onto the roller section 54, a plastic bag from the shelf 52 is manually slipped over the block by an operator and the block and bag are moved laterally on the section 54 to a position in front of an evacuating and sealing apparatus 56. To facilitate this movement, the roller section 54 is supported on parallel channels 58, 59 (see FIGS. 5 and 6), which are supported horizontally at the level of the gravity conveyor 42 by frame and leg structure 60. The roller section 54 has wheels 62 that run in the channels 58, 59. Two chains, 64, 65 are each connected at an opposite end of the roller section to a central depending angle member 66. The opposite ends of the two chains are connected to opposite ends of the support structure 60. The chain 64 is trained about a fixed pulley 70 and a movable pulley 71 and the chain 65 is trained about a fixed pulley 72 and a movable pulley 73. The fixed pulleys are secured to the ends of the support structure and the movable pulleys are supported on opposite ends of a piston rod 76 that has a central piston within a cylinder 78 that extends parallel to the channel guides 58, 59. The cylinder 78 is fixed to the support structure 60 beneath the roller section 54. A reinforcing guide rod 80 extends parallel to the piston rod, is connected to the rod at opposite ends, and is guided by a fixed supports 81, 82. Operation of the cylinder 78, which is double acting, moves the piston rod 76 in either direction, causing the movable pulleys 71, 73 to draw one of the chains 64, 65 and pay out the other chain, causing the roller section 54 to move in a controlled fashion in the channels 58, 59 between a position in line with the gravity conveyor 42 and a position opposite the evacuating and sealing apparatus 56. As shown in FIGS. 1 and 6, the orientation of the rollers 54a of the roller section 54 is parallel to the direction of lateral movement.

With the roller section 54 in position in front of the evacuating and sealing apparatus 56, a block and its surrounding bag are pushed by an operator into the evacuating and sealing apparatus, where a vacuum is drawn to remove all gas from within the bag, causing it to tightly encapsulate the block. The open end of the bag is then heat sealed closed.

After the bag is sealed, the encapsulated block is removed from the apparatus 56 across the roller section 54 and onto an adjacent roller turntable 83. At that time the operator reverses the direction of fluid to the cylinder 78 to return the roller section 54 laterally to its position in line with the roller conveyor 42 to receive the next block.

The roller turntable 83 has a roller conveyor portion 84 that is manually rotatable through 90° on a fixed support 85 so the block can be conveniently received from the roller section 54 and then moved in a direction parallel to the lateral travel of the roller section 54. The block is moved manually from the turntable 83 across a short gap onto a roller section 86 of a scale 87, where it is weighed and the weight recorded. The block is next moved in the same direction across a short gap onto a roller section 89 of a tilting mechanism 90, where a crate 91 is placed in an inverted position over the block and the block and crate are inverted vertically to a right-side-up position.

The tilt mechanism 90 supports a plurality of rollers 92 at their opposite ends in parallel angle irons 93, 94. A cross bar 96 between the angle irons 93, 94 serves as a reinforcing member and as an anchor for the piston rod 97 of a fluid actuator 98 secured at the end of its cylinder 99 to a supporting framework 100 of the tilting mechanism 90.

The end of the roller section 89 farthest from the scale 87 is supported for pivoting by depending ears 101 at the end of each angle iron 93, 94, each of which is mounted on a pivot pin 102. As a result of this construction, extension of the piston rod 97 of the actuator 98 causes the roller section 89 to tilt from the horizontal position shown in solid line in FIG. 7 through the phantom position shown, to a position slightly beyond a vertical orientation.

Figure 7:
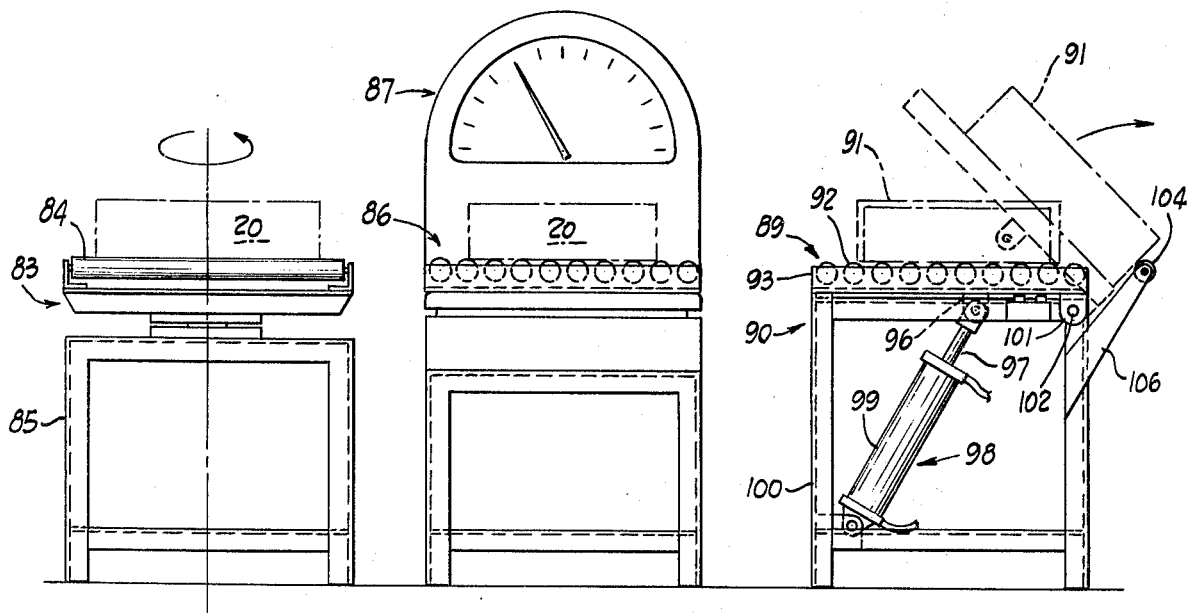
FIG. 7 is a side elevational view of a portion of the conveyor system of FIG. 4, showing the turntable portion, weighing station, and tilting mechanism, taken along the line 7—7 looking in the direction of the arrows.

A stop roller 104 is supported at the upper ends of cantilevered bracket arms 106, 107 beyond the pivoted end of the roller section 89, considered in the direction of block travel, and slightly above the level of the rollers 92 of the roller section 89. As shown in FIG. 7, the stop roller 104 engages the end of the crate 91 as the conveyor section 89 is tilted upward, and supports the crate and block, serving as a pivot about which they are tilted. When the crate and block reach a vertical position, an operator lowers the crate and contained block onto a carriage or the like (not shown) adjacent the stop roller. The roller section 89 is then lowered to its horizontal solid line position of FIG. 7, to receive a subsequent block for crating and inverting.

While the operation of the described apparatus will be understood from the foregoing, the method of processing Swiss cheese through the brine tank and handling system, from compressed curd to crated blocks for aging and shipping, will be briefly summarized.

Blocks of compressed curd sufficient in number to extend across the width of the brine tank 12 are moved to a location adjacent the side wall 13c and end wall 13a of the tank on the movable truck 24. In the preferred method, seven blocks weighing approximately 200 pounds each are carried by each truck and are moved one at a time into the brine bath by the overhead conveyor 14 and are guided into a row adjacent the back wall 13a of the tank by a 2×4 beam wedged between opposite side walls 13c, 13d to define the receiving row. Upon loading of the seven blocks, the beam is moved down the tank the width of a second row, the loaded blocks are advanced to a position against the beam, as by a surface current flow of the brine bath caused by the air manifold 22, or by the floating boom and drag line, and a second row of blocks is transferred from another truck. This process is continued until the brine tank is filled with the blocks 20. Bubblers in the bottom of the tank circulate the brine to maintain the salt in solution at maximum solubility for the temperature. At the same time, the temperature of the bath is controlled to approximately 40° F. The blocks are allowed to remain in the tank for approximately ten hours or more.

After the desired time in the brine tank, the blocks are removed by operating the discharge conveyor 14 to remove the blocks adjacent the end wall 13b. Each block is moved manually across the tank into engagement with the inclined discharge conveyor, after which the conveyor lifts and carries each block from the tank and transfers it to the inclined gravity-operated roller conveyor 42. Upon the removal of the blocks adjacent the end wall 13b, the remaining blocks in the tank are advanced a distance of one row toward the end wall 13b by the flow of surface current caused by the air manifold 22 and the drag line apparatus 37. Alternatively, the air manifold alone can be used to move the blocks. By virtue of the drag line apparatus and/or the air manifold, an operator adjacent the discharge conveyor 16 can empty the brine tank of cheese blocks without manually lifting the blocks or moving from the position adjacent the discharge end. During removal of the end row of blocks, the remaining blocks are held in orderly arrangement by wedging a 2×4 beam across the tank, adjacent a row upstream from the row being removed. For purposes of illustration, FIG. 1 shows in one figure two conditions of the blocks, those at the right hand end in the orientation shown are illustrative of the tank as it is being loaded, and not completely filled. At the left end, the blocks are shown in phantom, illustrative of blocks at the end of a batch, being removed. It will be understood that the process in its preferred operation is not continuous and thus the removal of blocks does not occur during the loading of other blocks, but rather only after the tank is first filled.

During unloading of the tank, blocks are continuously advanced, in spaced relationship, to the gravity conveyor 42 and roll out of the brine tank room and into the handling area, where the 200 pound blocks are packaged and crated without lifting. As the blocks move along the conveyor 42, and onto the laterally movable roller section 54, they are covered with a plastic bag and then moved laterally to a position where they can be pushed on the roller section into the evacuating and sealing apparatus 56. Such lateral movement is under the control of an operator who causes the roller section 54 to move to the right or left in the orientation of FIG. 1 by controlling the supply of fluid to the actuator 78. The plastic bag containing the block is evacuated and heat sealed within the apparatus 56. The bagged block is then manually pulled from the sealing apparatus 56 onto the roller turntable 83, which is then rotated 90° to facilitate movement of the block to the scale 87, where the block is weighed and moved to the tilting mechanism 90. With the block on the tilting mechanism, a wooden crate 91 is placed upside down upon the block. The operator causes the roller section 89 of the tilting mechanism to pivot upward to a position just beyond the vertical by operating the actuator 98, and then manually lowers the crated block to a horizontal position, now right side up, having been rotated 180 degrees. The block is then carried to storage where it is aged prior to shipment.

With this arrangement, handling of a day's production of the blocks through the brine room, packaging, and storing operations, can be accomplished at the beginning and end of each work day in two periods of approximately one and one-half hours each, by four workers. Thus, in a specific example of the preferred practice of this invention, 61,600 pounds of curd are handled through the brine tank, packed and stored, using 12 man hours per day, or 5,133 pounds per man hour. Previously, when the blocks were manually handled in their transfer to and from the brine tank and into crates, approximately 1250 pounds per man hour were handled. Thus, an improvement in efficiency of over four times has been achieved, resulting in substantial cost savings and improvement in employee morale by virtue of the labor saving nature of the apparatus.

While a preferred embodiment of the present invention has been described in detail, it will be apparent that various modifications or alterations may be made therein without departing from the spirit and scope of the invention, set forth in the appended claims.

What is claimed is:

1. In a process of making Swiss cheese, including the steps of:

producing curd from milk in vats, using a bacterial culture, separating the curd from whey in settling tank trucks having removable end and side panels, including placement of top plates and weights upon the curd to remove excess moisture and form a uniform bulk product, solidifying the curd into slabs, removing said panels and cutting the slabs into large heavy blocks, removing moisture from the blocks by treating them in a brine solution, and crating the blocks and stacking the crated blocks for aging, the improvement comprising:

moving the settling tank trucks to adjacent a brine tank containing the brine solution, hoisting the blocks one at a time directly from the settling tanks and carrying them by overhead conveyor to a location over one end of the brine tank, releasing each block into the brine solution by lowering it until it floats, moving blocks across the tank to fill the width of the tank with a row of floating blocks, moving rows of floating blocks along the tank with an air flow from a manifold just below the surface of the brine solution adjacent the said one end of the brine tank, removing floating blocks from the opposite end of the brine tank by moving blocks from a row toward an endless inclined conveyor belt partially submerged in the brine solution at said opposite end of the tank, transferring the blocks from said conveyor belt to a roller conveyor and transporting the blocks to a bagging station, placing a plastic bag about each block, withdrawing air from the bag and sealing the bag about the block, conveying the bagged blocks to a crating station and supporting the blocks one at a time on a tiltable support, placing a crate upside down over the block on the tiltable support, and rotating the block and crate approximately 180° to a right side up position by rotating the tiltable support from a horizontal position toward a vertical position.

2. The process of claim 1 wherein the improvement further comprises moving rows of floating blocks along the tank from a position adjacent the discharge end with a drag line and floating boom.

3. The process of claim 1 wherein the improvement further comprises temporarily securing barriers across the tank during loading of blocks to hold floating blocks against movement toward said opposite end of the tank.

4. In a process of making Swiss cheese, the steps of producing curd from milk in vats, using a bacterial culture, separating the curd from whey in settling tank trucks having removable end and side panels, including placement of top plates and weights upon the curds to remove excess moisture and form a uniform bulk product, solidifying the curd into slabs, removing said panels and cutting the slabs into large blocks, moving the settling tank trucks to adjacent a brine tank containing a brine solution, hoisting the blocks one at a time directly from the settling tanks and carrying them by conveyor to a location at one end of the brine tank, floating each block in the brine solution and moving blocks across the tank to fill the width of the tank with rows of blocks, moving rows of floating blocks along the tank at least in part with a surface current of the solution, removing floating blocks from the opposite end of the brine tank by moving them toward a first conveyor at least partially submerged in the brine solution at said opposite end of the tank, transferring the blocks by a second conveyor to a bagging station, placing a plastic bag about each block, withdrawing air from the bag and sealing the bag, conveying the bagged blocks to a crating station and placing the blocks one at a time on a tilt mechanism, and placing a crate upside down over the block on the tilt mechanism and rotating the block and crate approximately 180° to a right-side-up position and then lowering the block and crate to a right-side-up position.

5. In apparatus for making Swiss cheese, including a tank containing a brine solution in which blocks of solidifying curd are floated for moisture removal, the improvement comprising:

an overhead conveyor located adjacent and over one end of the brine tank, said conveyor including means to carry a block supported on a plate over the tank and to lower it into the brine solution until the block floats and is released, a manifold extending across the width of the tank at said one end at a location just beneath the surface of the brine solution, an inclined power-driven conveyor partially submerged in the brine solution at said opposite end of the tank for engaging floating blocks and carrying them from the tank, conveying means for transferring blocks from said inclined conveyor to a bagging station and to a subsequent crating station, and a tilting conveyor section at the crating station, said section including means for supporting a block to receive a crate upside down over the block and actuating means for rotating the supporting means and a supported block and crate from a horizontal position to a generally upright position.

6. In apparatus for making Swiss cheese, including a tank containing a brine solution in which blocks of solidified curd are floated for moisture removal, and apparatus for handling the blocks during processing, the improvement comprising:

an overhead monorail conveyor including a track portion located partially to one side of the tank and partially extending over and across one end of the tank, and a carrier portion including a hoist and a work grab releasable when a supported block is buoyed by the brine solution during lowering, means for moving floating blocks along the tank, said means including an air jet manifold in said tank across said one end of the tank just below the surface of the brine solution oriented to create a tidal surface flow toward the other end of the tank, an electrically driven, endless, inclined, mesh belt first conveyor at said opposite end of the tank, one end of the conveyor extending into the tank and submerged in the brine solution, for receiving floating blocks and carrying them from the tank, a gravity feed roll second conveyor outside the tank adjacent the first conveyor for carrying blocks by gravity from the first conveyor, a third conveyor roller section at the end of said second conveyor, movable laterally of the second conveyor for conveying blocks to an evacuating and sealing means, means adjacent said laterally movable conveyor section to evacuate and seal a bag about a block, a fourth conveyor for carrying sealed blocks, means including a power driven tilting support for receiving a block from said fourth conveyor, supporting the block to facilitate placement of a crate over the block, and inverting the block and crate.

7. Apparatus as set forth in claim 6, wherein said means for moving floating blocks along the tank includes a floating rigid boom in the tank extending across the width and movable along the length of the tank, and a drag line connected to the boom and extending to the end of the tank opposite from said one end for moving the boom along the tank.

8. Apparatus as set forth in claim 6 wherein said power-driven tilting support includes a supporting frame, a roller assembly pivotally secured at one end to the frame to tilt about an axis parallel to the rollers, a fluid actuator secured between the frame and roller assembly for rotating the roller assembly about said axis, and a stop roller supported at a fixed location parallel to said pivot axis and spaced from the roller assembly for supporting the end of a crate and block during tilting of the roller assembly.

* * * * *